(12) United States Patent
Cobb

(10) Patent No.: US 10,805,289 B2
(45) Date of Patent: Oct. 13, 2020

(54) BIOMETRIC CYBERSECURITY AND WORKFLOW MANAGEMENT

(71) Applicant: SoftWarfare, LLC, Shawnee, KS (US)

(72) Inventor: Wyatt Cobb, Mission Hills, KS (US)

(73) Assignee: SoftWarfare, LLC, Prairie Village, KS (US)

( * ) Notice: Subject to any disclaimer, the term of this patent is extended or adjusted under 35 U.S.C. 154(b) by 223 days.

(21) Appl. No.: 15/970,071

(22) Filed: May 3, 2018

(65) Prior Publication Data

US 2019/0342286 A1    Nov. 7, 2019

(51) Int. Cl.
*H04L 29/06* (2006.01)
*G06F 21/32* (2013.01)
*G06F 21/60* (2013.01)
*G06K 9/00* (2006.01)

(52) U.S. Cl.
CPC .......... *H04L 63/0861* (2013.01); *G06F 21/32* (2013.01); *G06F 21/606* (2013.01); *G06K 9/00087* (2013.01); *G06K 9/00221* (2013.01); *G06K 9/00617* (2013.01); *G06K 9/00892* (2013.01); *H04L 63/0263* (2013.01); *H04L 2463/082* (2013.01)

(58) Field of Classification Search
CPC ............. H04L 63/0861; H04L 63/0263; H04L 2463/082; G06K 9/00892; G06K 9/00087; G06K 9/00617; G06K 9/00221; G06F 21/606; G06F 21/32
USPC ........................................................ 713/186
See application file for complete search history.

(56) References Cited

U.S. PATENT DOCUMENTS

| 8,955,076 B1* | 2/2015 | Faibish ................... H04L 63/08 726/7 |
| 9,537,886 B1* | 1/2017 | Gareau ............... H04L 63/0227 |
| 9,641,544 B1* | 5/2017 | Treat ................... H04L 63/1425 |
| 2015/0101053 A1* | 4/2015 | Sipple ................. H04L 63/1425 726/24 |
| 2016/0057139 A1* | 2/2016 | McDonough ....... H04L 63/0861 726/6 |
| 2018/0219879 A1* | 8/2018 | Pierce ................. H04L 63/1416 |

* cited by examiner

*Primary Examiner* — Kambiz Zand
*Assistant Examiner* — Aubrey H Wyszynski
(74) *Attorney, Agent, or Firm* — Erise IP, P.A.

(57) ABSTRACT

A system, method, and media for providing web-based security to a workflow process is presented. Data may be processed in a web-based workflow management system. The system may detect the transfer of high-level security data through the workflow. Upon detection of the data transfers the system may request review and approval in the form of a biometric input from an approved user to allow the data to be transferred.

20 Claims, 7 Drawing Sheets

BIOMETRIC CYBERSECURITY AND WORKFLOW MANAGEMENT

BACKGROUND

1. Field

Embodiments of the invention are broadly related to managing large data workflows. More specifically, embodiments of the invention are directed to providing cybersecurity through the use of biometric authentication to the management of large data workflows.

2. Related Art

Many businesses no longer have large databases storing information on site. Data from personal computers, small businesses, and large corporations are stored in remote locations and accessible through web-based applications on web-based systems that may be scattered and not in one central location. This causes problems maintaining efficient workflow processes, regulation compliance, and security in the resulting large-scale network. Additionally, independent application developers are becoming more and more involved in integration work thus compounding the problems. Further, processes such as service to the applications and on-site hardware are slowed when service ticketing is not automated. This causes a significant burden on the professionals that must manually process the tickets.

What is needed is more automated systems that integrate the applications and security at a central location. The central location may be automated reducing the burden on users, specifically information technology technicians, while maintaining a high-level of security by employing biometric authentication and verification for workflow and change orders.

SUMMARY

Embodiments of the invention address the above-described need by providing for a web-based system that may provide applications and automatically manage workflow and changes while maintaining high-level security and regulation compliance.

In particular, in a first embodiment, the invention includes a system for providing security to a workflow process on a web-based system, comprising a sensor configured to collect biometric data for a user, a processor, a data store storing biometric identity data for a plurality of authorized users, and one or more non-transitory computer-readable media storing computer-executable instructions that, when executed by the processor, perform a method of proving security to a workflow process, the method comprising steps of receiving a request to transfer data from a first location to a second location, detecting a threat associated with the transfer of the data, determining a risk level of the threat requesting a biometric authentication from the user based at least in part on the risk level of the threat, receiving, via the sensor, biometric data indicative of an identity of the user, comparing the biometric data indicative of the identity of the user with the biometric identity data stored in the data store, determining, from the comparison of the biometric data indicative of the identity of the user with the biometric identity data stored in the data store, that the user meets a minimum requirement, and receiving, from the user, an approval of the transfer of the data.

In a second embodiment, the invention includes a method for providing security to a workflow process in a system, comprising the steps of receiving a request to transfer data from a first location to a second location, analyzing the data to determine a risk level of the data, if the risk level of the data is above a predetermined threshold, requesting identity information from a user, receiving the identity information from the user via a biometric sensor, comparing the identity information from the biometric sensor with stored biometric data, determining whether the identity information from the biometric sensor and the stored biometric data match, if the identity information from the biometric sensor matches the stored biometric data, approving the request to transfer the data, and if the identity information from the biometric sensor does not match the stored biometric data, denying the request to transfer the data.

In a third embodiment, the invention includes one or more non-transitory computer storage media storing computer-executable instructions that, when executed by a processor, perform a method of providing security to a workflow process on a web-based system, the method comprising the steps of receiving a request to transfer data from an application running on the web-based system, determining a security level of the data, if the security level of the data is above a threshold, requesting authentication from a user, receiving biometric information indicative of an identity of the user from a biometric sensor, comparing the biometric information with stored biometric information indicative of the identity of an authorized user, determining whether the biometric data matches the stored biometric information, if the biometric data matches the stored biometric data, approving the request to transfer the data, and if the biometric data does not match the stored biometric data, denying the request to transfer the data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
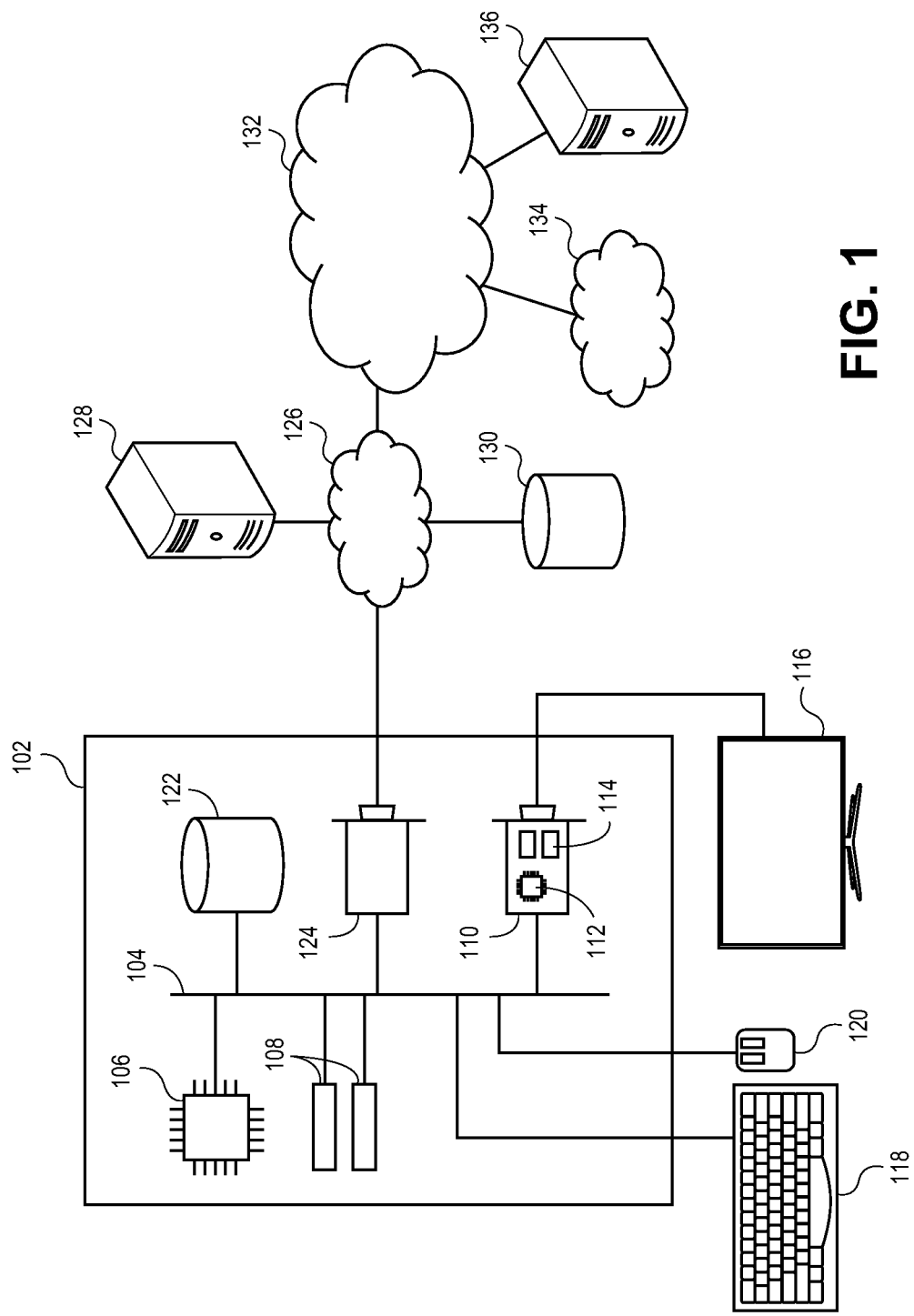
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above problems by providing a system and method for providing high-level security measures to workflow processes. At a high level, the system integrates workflows between components. Fort example a first component may transfer data to a second component. Manual ticketing systems may require a user to manually transfer this data, or to approve the transfer of any data across a security boundary. This is a laborious process requiring significant staffing. By contrast, embodiments of the invention automate this process, allowing data to flow unimpeded when it should flow, blocking data that should not flow (such as malicious code), and requiring authorization when the data is sensitive (for example, credit card lists or customer databases). Further the system can automatically learn which data is which so as to minimize the user interaction for future workflows.

The system may be an application and integration platform that connects applications, systems, devices, and networks as well as other platforms, users, and applications. The application and integration system may manage the workflow processes while providing security in the form of vulnerability scans, threat detection, and risk management. Identification may be performed requesting passwords, identification numbers, biometric scans, and threat detection and risk management may be performed analyzing data using artificial intelligence algorithms.

The system may be a web-based system that may provide a web-based application platform that provides integration of applications that may be stored on the system and/or stored on any of the above-mentioned devices associated with the web-based system. The system may integrate applications to create endpoint-to-endpoint connections for application-to-application, business-to-business, mobile application integration, application process integration publication, and internet-of-things scenarios. The system may provide all data mapping and ensure compliance to any data management regulations.

In some embodiments, the system may also provide levels of protection for data being transferred from one location to another. The data may be coded with a security level only allowing approved users to access the data. The system may automatically review the data and determine that the data itself may be a threat, or meet criteria defining a certain level or threshold to be suspicious, such as malware or any other data that may be defined as a threat. Upon detection of the possible threat, the data may require a high-level security confirmation to access or transfer. An information technology associate, engineer, or analyst assigned to maintain the system or remove the malware may provide multifactor authentication including biometric information to access the system and allow or dis-allow the data transfer.

Further, in some embodiments, the system may request authentication of the data such as in software updates and workflow changes. In some embodiments, the system may request identity information from a user through biometric sensors such as a finger print scanner, a retinal scanner, a camera that may utilize facial recognition software, or any other sensor that may detect biometric characteristics. The biometric data may be compared with stored biometric data to determine the identity of the user providing the biometric data. The stored biometric data may be stored in association with a user profile storing the user identity and other information associated with the user such as age, residence location, security level information, employee identification number, company information, or any other information in determining the identity, authority, and security level of the user. Alternatively, the identity may be secret and the biometric data may be associated with a pass/fail indication in the event that the identity of the user submitting the biometric information must remain secret.

The system may also provide higher levels of autonomy, reducing the burden on information technology service ticketing. The ticketing may be done automatically when requests for service are issued and the updates may be uploaded. The system may request administrator verification of an update or service upon detection of the uploaded update. The verification may be administered via biometric input through a biometric sensor as described above.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a recording device manager, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Additionally, any number of sensors (not shown) such as the biometric sensor discussed above may also be connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In certain embodiments, computer 102 can itself be directly connected to Internet 132. In some embodiments, the system depicted in FIG. 1 may be connected to a web-based application platform and run applications through the web-based platform or may provide the web-based platform to other computers to run applications, manage workflows, and store and manage data.

Figure 2:
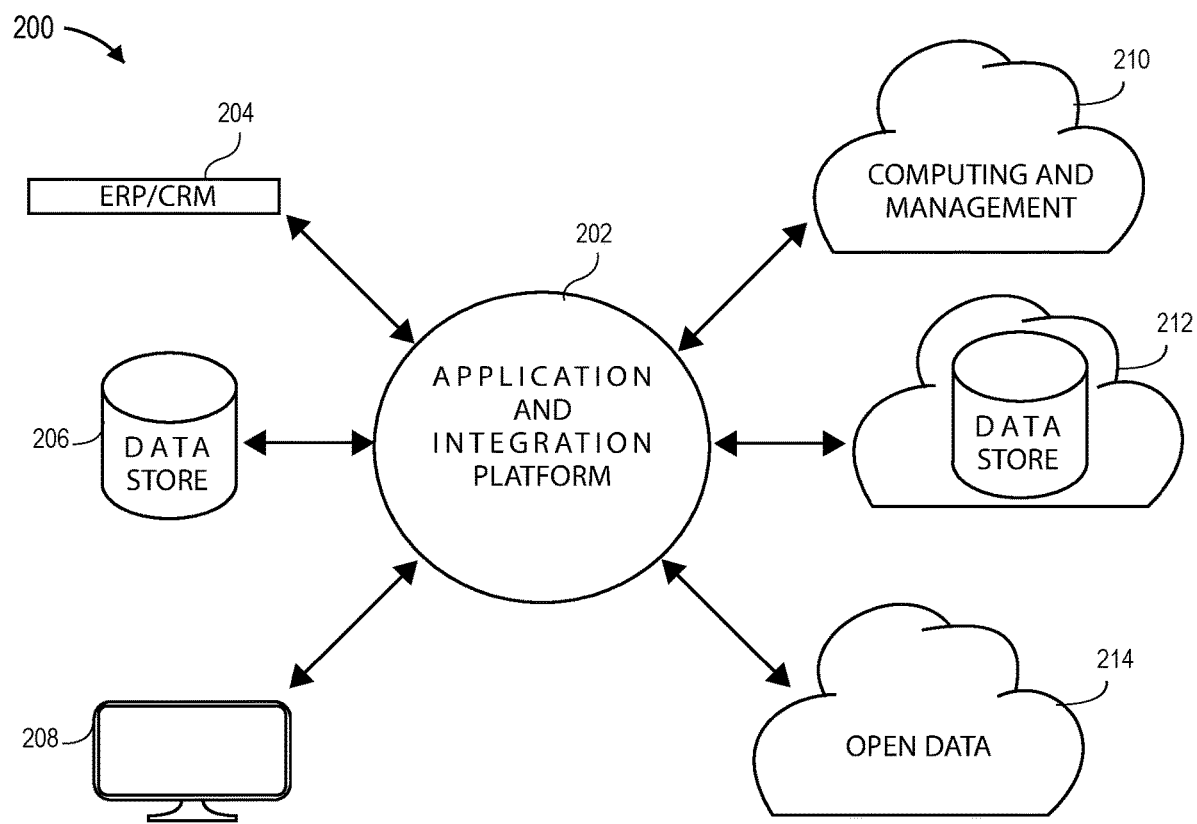
FIG. 2 depicts an exemplary platform in certain embodiments of the invention.

Turning now to an embodiment depicted in FIG. 2, presenting a network 200 in certain embodiments of the invention, the system may be an application and integration platform 202. The application and integration platform 202 may provide web-based workflow management and security while supporting application-to-application, business-to-business, or any other connection and communication that may be useful. The system may provide platform services such as integration Platform as a Service (iPaaS) and Software as a Service (SaaS). At a high-level, the system provides capabilities to enable subscribers to implement data, application, application program interfaces (API) and process integration projects spanning cloud-resident and on-premises endpoints. This is achieved by developing, deploying, executing, managing and monitoring integration flows (integration interfaces), or integration applications bridging between multiple endpoints and enabling them to work together. In some embodiments of the system, on-premises hardware and software such as Enterprise Resource Planning (ERP) and Customer Relationship Management (CRM) software (ERP/CRM 204), local data store 206, and homegrown applications 208 may be connected to the system that may support web-based functions such as computing and management 210, data store and management 212 and open data sources 214. Additionally, the system may support many more services and features that may be available.

In some embodiments of the system a high level of security is integrated. The security may be customized by the user, an administrator, or any person with a level of clearance above a minimum threshold. The security may also be determined by and meet the standard of compliance regulations such as those provided by PCI-DSS, NERC CIP, SCADA, HIPA-HYTRUST, GDPR, FERC, or any other set of standards.

In some embodiments of the invention common communication protocols may be used between different endpoints. The system may provide a single platform integrating these endpoints and provide the data mapping from one endpoint to the next. Typical communication protocol connectors that may be used in embodiments of the invention are FTP, HTTP, AMQP, MQTT, Kafka, AS1/2/314, or any other communication protocol connectors that may be used and integrated into the system.

In some embodiments, the system may be capable of mapping a diverse group of data formats and standards. For example, typical data formats that may be used are XML, JSON, ASN.1. However, any other format may be used. Without departing from the scope of the invention typical data standards are EDIFACT, HL7, SWIFT. However, any other standard for describing and formatting data may be used.

Embodiments of the system may map data from endpoint-to-endpoint such as from a source to a destination or peer-to-peer. The system may provide data quality, routing and orchestration, integration flow for development and life cycle management tools, integration flow for operational monitoring and management, full life cycle API management, and security for all data.

In some embodiments, a user of the system may set up a profile. The profile may include the user's name, date of birth, address, rank or position within a company, company identification number, as well as any biometric data such as fingerprint information, facial recognition information, iris scan information, DNA information, or any other type biometric data that may be useful in identifying the user.

Figure 3:
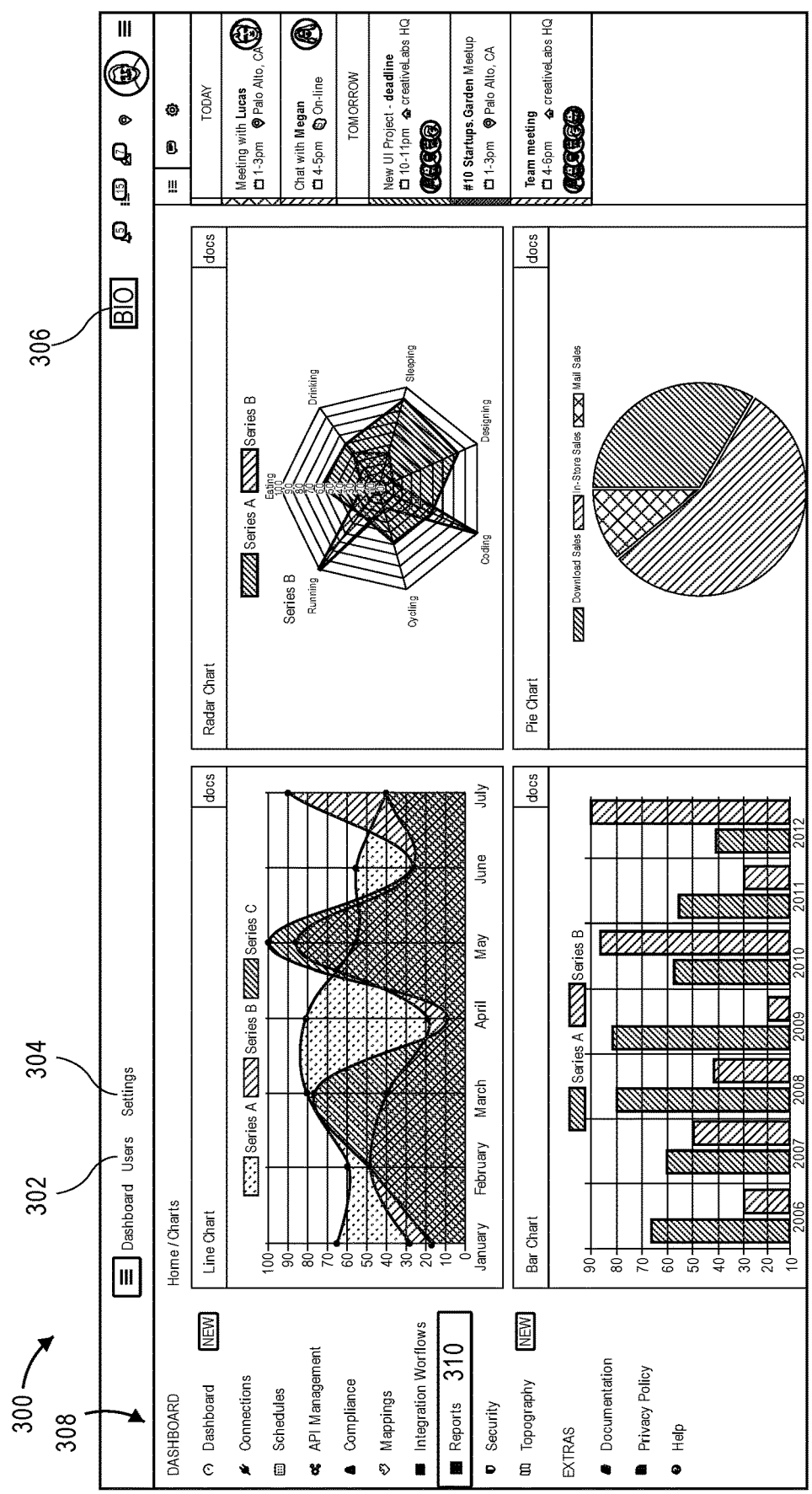
FIG. 3 depicts an exemplary user interface in some embodiments of the invention.

FIG. 3 depicts an exemplary Graphical User Interface (GUI) 300 that may be presented to the user for managing workflow, applications, and security. The GUI 300 may provide the user with the ability to track and manage all workflow with any applications and businesses connected through the application and integration platform as a service. The user may create the user profile described above via the GUI 300 and make all workflow management decisions and changes via the GUI 300. The user profile may be accessed through a user tab 302 and may include information indicative of the user such as name, birth date, address, company, employee identification number, or any other information that may be used to identify the user. The user profile may also access biometric information indicative of the user such as fingerprint data, retinal scan data, facial recognition data, DNA data, or any other biometric information that may be used to identify the user. The settings may be managed through a settings tab 304 and the biometric information may be accessed through an application-sensor interface and the biometric sensor may be activated through a biometric tab 306. The GUI 300 may provide the user with a selection menu 308 that provides the ability to manage all workflows and process and track day-to-day operation. As depicted in FIG. 3, the GUI 300 may display reports 310 for managing projects. The GUI 300 may provide the user with notifications 312 and connections to social media, email, mobile applications, or any other method of communication. The GUI 300 may interface with a biometric sensing device that may receive biometric information indicative of the user when the biometric button 304 is selected. The application may run on the system and be connected to and interface with any other applications running on the system.

Figure 4:
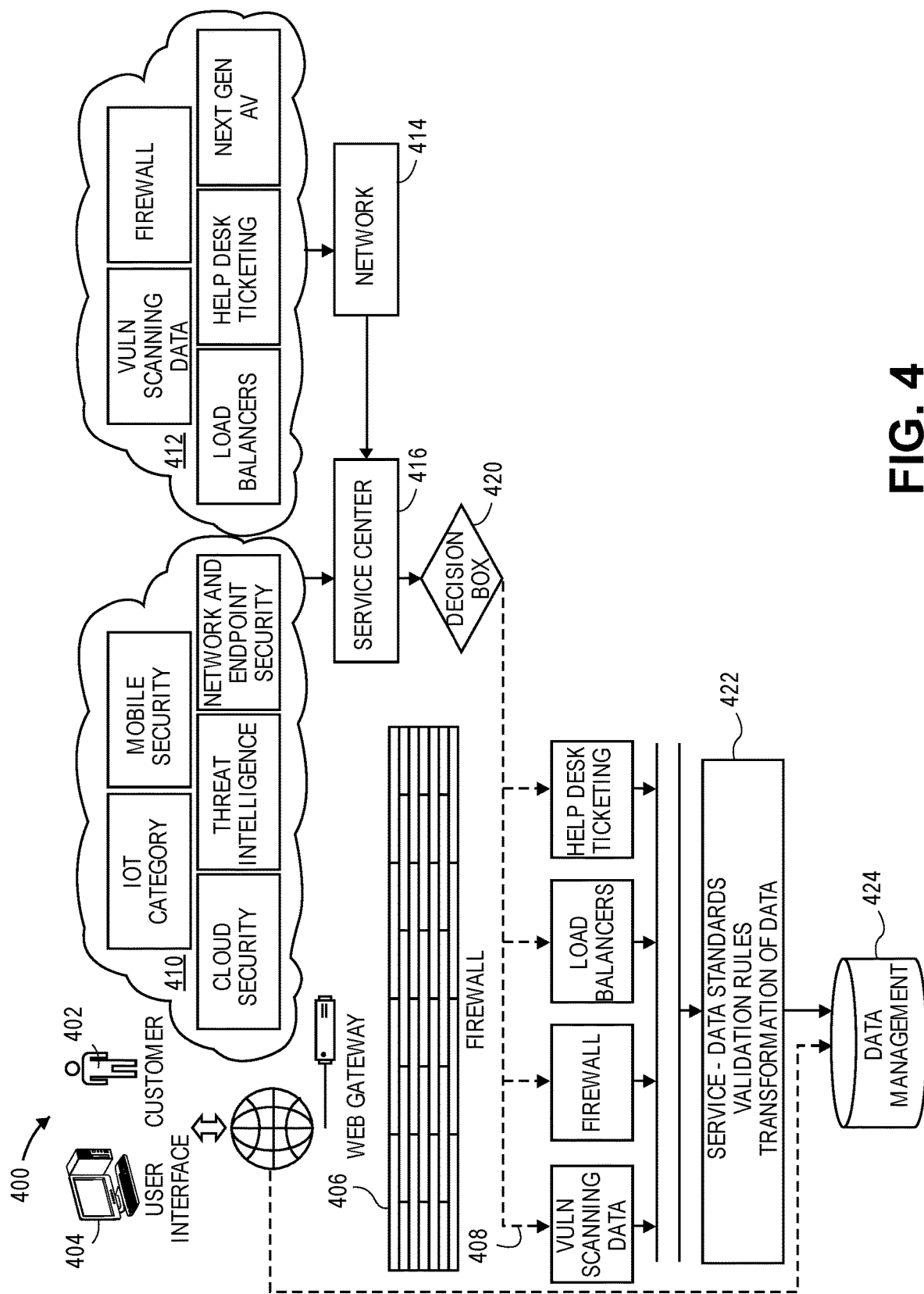
FIG. 4 depicts an exemplary network associated with certain embodiments of the invention.

Turning now to an exemplary embodiment depicted in FIG. 4 presenting an exemplary network 400 of the invention. As depicted, a customer 402 may interface with the system, which may provide the application and integration platform as a service via the user interface and computer 404. The computer 404 may provide access to the Internet and connect to the system. The computer 404 may run applications and connect to applications running on the system. The user 402 may access the Internet through the web gateway 406 and encounter a firewall 408. The firewall 408 may include additional firewalls that may be set up and provided by the system or by any other business or application connected to the network 400. The firewall 408 may also provide vulnerability scanning, load balancing, help desk ticketing, and may also connect and transfer data between other applications and networks. The system may provide security for network 400 through cloud 410 and connect to other networks 414. The security may also provide updates through lifetime service center 416. The system may make decisions on updates and security at decision box 420 and biometric input request may be sent from the decision box 420 to the customer 402 or any other user that may be on the network 400. The information may then be validated and transformed and checked for regulatory compliance at the standards validation rules and transformation of data box 422. The information transmitted may then be stored and managed at the data store and management box 424.

In some embodiments, the customer 402 may connect a with a company via the network 414. The customer 402 may access different corporate resources and systems using authentication techniques such as, for example, a username and password. The customer 402 may be approved to access high level information using third-party corroboration. For example, the customer 402 may attempt to access information that is guarded by a company firewall requiring additional verification. The additional verification may be a third-party system independent of the customer 402 and the company or may be part of the company but a separate system. The third-party system may require additional authentication through a Multifactor Authentication (MFA) platform and an Enterprise identity management (IAM) solution provider. The customer 402 may have to provide biometric authentication to the third-party system for corroboration with the company. The customer 402 may provide fingerprint, iris, palm, face or any other biometric data that may be stored in the third-party system for authentication corroboration. The information provided by the customer 402 to the third-party system may also be a username, password, numerical code, or any other information that may be used individually or as part of a multifactor authentication.

Figure 5:
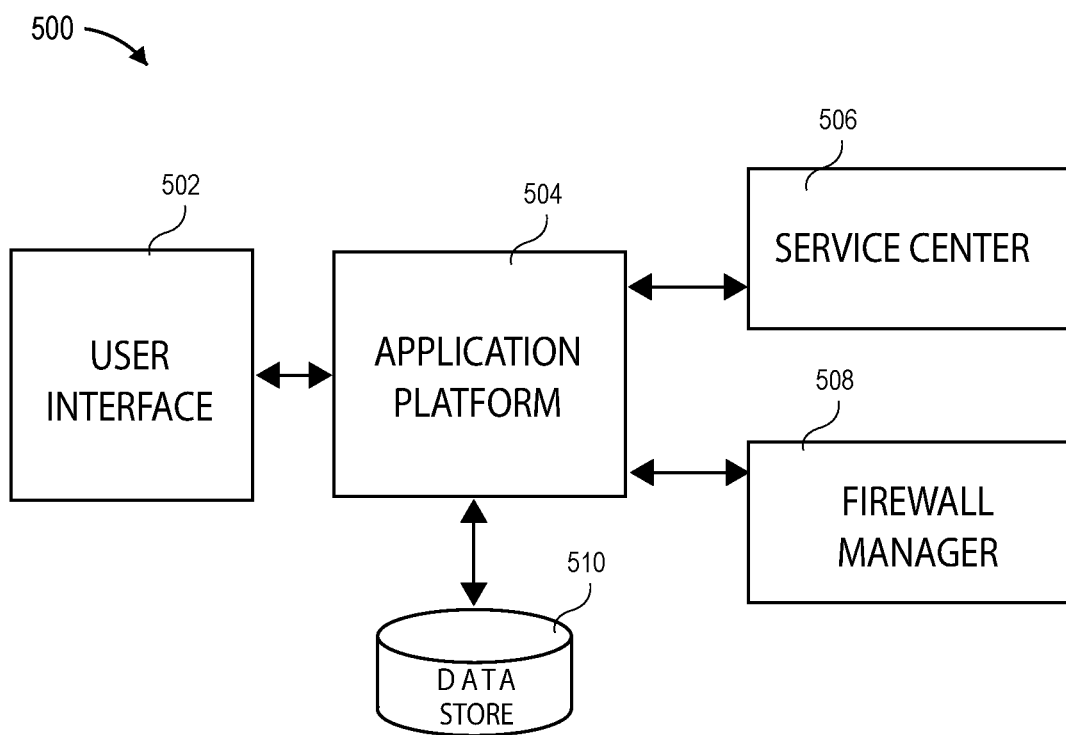
FIG. 5 depicts an exemplary diagram representing some embodiments of the invention.

Turning now to an exemplary embodiment depicting a system configuration 500 in FIG. 5, a user may interface with a web-based application via user interface 502 that may be user interface and computer 404. The web-based application may be supported by the application and integration platform 504 and which may be the application and integration platform 202. The application and integration platform 504 may be connected to a service center 506, a firewall 508, which may also be a firewall management system, and a data store 510 which may also be a data management system.

The firewall 508 may provide vulnerability scans, threat detection, and risk management. The firewall managements system may also provide real-time regulation compliance and security orchestration access to the user through the application and integration platform 504. The firewall 508 may be in constant communication with the application and integration platform 504 updating and creating rules based on user input and artificial intelligence behavior learning and modifying all rules and updates to comply with national and international regulations.

The service center 506 may provide requests for updates and changes to the system. The update and change requests may be updated in accordance with the rules from the firewall 508. The workflow may pass through the application and integration platform 504 providing communication between the different systems working together. The application and integration platform 504 may also provide the communication with applications, systems, devices, and network with other platforms, users, and applications.

Continuing with the exemplary embodiment depicted in FIG. 5, a large corporation may have large amounts of data transferring from one location or platform to another different location or platform in an application-to-application or business-to-business setting. The data may also be passed to many different locations serviced by many different platforms and associated software in a third person scenario. The data may be mapped to formats compatible with the various associated software. The data may also pass firewalls associated with each different platform. The system may provide all mapping and security at one central location and interconnectivity to the systems described above as well as a platform for application at one central location.

For example, a typical workflow passes daily between two companies running on different platforms. A company may implement the system described above and have user settings along with artificial intelligence that learns the system and automatically requests authentication based on specific detections and out of the ordinary data flows. The artificial intelligence may utilize neural networks, fuzzy logic, statistical algorithms, or any other mathematical function, algorithm, or theory to analyze the data.

The system may include firewall and firewall management systems that scans for system vulnerabilities, provides regulation compliance, and provides automatic and user orchestration of security measures and may also add a biometric security level upon detection of a critical event. The critical event may be realized through detection of a divergence from the learned behavior or upon request of a change notification. The algorithm may learn that a combination of characters represents access to a database storing sensitive materials and may be a threat. The combination of characters may or may not be blocked by the firewall as the database may store other non-sensitive information. Biometric authentication may be required for the system to relay the access request to access the data. This may provide a layer of security above the standard today. Providing this higher level of security also reduces the burden on administration since this access may be triggered and obtained by the system and not by individuals.

In some embodiments, high-level security restrictions may require multiple forms of identification. For example, an administrative task such as accessing employee time sheets may require the administrator's employee identification number. The number may be submitted by manually entering on a keypad or may be scanned using a barcode or radio frequency identification (RFID). A higher-level security feature may also require a password. The administrator may make changes to the timesheets of the employees. This level of access may require the employee identification number to access the information and a biometric identification such as a fingerprint scan to enter a field that allows editing of the timesheets. A request for biometric identification may be sent by the web-based application and integration platform 504 and may be presented to the administrator through the GUI 502 or on a web-based application supported by the application and integration platform or an on-site application. The administrator may input biometric information via a biometric sensor that may be activated using the on-site application or hardware, via the GUI 502, or another application supported by the web-based application and integration platform 504. Once the biometric data is received by the application and integration platform 504 the biometric data may be compared to an administrator's profile comprising stored biometric data stored on the database management system 510. The comparison may result in a positive match signifying approved access for the administrator or a negative match signifying denial of access for the administrator. In some embodiments, the administrator from the example above may not have the authority to gain access and the biometric data may be received from a different source with a different security level.

In some embodiments, the administrator may be a new employee or have recertification or training that is needed. In the event that the administrator is not up-to-date on any of the certifications or trainings the administrator may automatically or manually be denied access to the application and integration platform 504, a physical data center, or any other online data or physical component of the system. For example, an administrator is denied access to a data center. The administrator receives notification that the deadline has passed for new compliance training and that the administrator has not completed the training. Upon completion of compliance training and approval from management the administrator may regain approval for access. The notification may be provided to the administrator and management by the system through an interface to the data center, a mobile device, tablet, or any other device that may receive text message, instant messages, email, phone calls, or any other method of communication. Once the administrator is approved, the administrator may gain access through biometric authentication, scanning a key card, RFID, or any combination thereof.

In some embodiments, the system may continuously update firewall rules and security management using artificial intelligence software. The software may learn threats and what information is typically approved thus altering the threat level of data flows and data flows that require biometric verification. The workflow process may be updated according to the rules of the firewall once it has been established that the workflow complies with federal, state, and international regulations. The updates and changes may also be implemented by any user provided that the user can supply the necessary information for approval by the system. The necessary information may be identity information such as a password, an ID number, or biometric information as described above.

Continuing with the exemplary embodiment depicted in FIG. 5, a company administrator may issue a request to change a workflow process to comply with federal, state, or other regulations such as NERC/CIP or SCADA for example. The request may flow through a workflow process that integrates a Help Desk ticketing system, or service center 506, and change control system methodology with a firewall management console or a firewall monitoring provided by the firewall manager 508. The system may recognize that the request has been made and send an automatic request for biometric verification that the administrator is the person that sent the request. The biometric input may be recognized directly through the system application downloaded on a mobile device or a computer as described above. The data received via the biometric input may then be compared to biometric data stored on the administrator's profile to verify the biometric input. Once the administrator's identity is confirmed the change may be processed. A change of this sort may alternatively or additionally require an information technology (IT) administration approval. Similarly, a biometric input request may be sent to the IT administrator for verification. The biometric input may be accessed directly through the system application or a request may be sent via email, text, social media, or via any other form of communication. The change request may also be automatically altered by the system to ensure unwanted or unnecessary changes do not take place. The system may optimize workflow and vary any method or change request as necessary to ensure that the workflow is efficient and complies with regulations.

The system may also have different rules and settings for different clients. The rules and settings may comply with all regulations but be different between different applications and/or business-to-business communications. All updates, actions, transactions, workflows, and data transfers may be stored on the database management system. All communication may be handled by the system and mapped to the different endpoints.

In some embodiments involving the communications mention above, a third-party vendor may need access to information or systems within a company's infrastructure. Biometric authentication of the third-party may be required as part of an integrated workflow. For example, vendor management at a given business or company where the business or company integrates technical systems to allow third party access may require third-party vendor authentication as part of third-party risk management. The third party-vendor may provide biometric authentication that is compared to a database of biometric information and allowed access in the event that the biometric information provided as compared to stored biometric information is approved.

Figure 6:
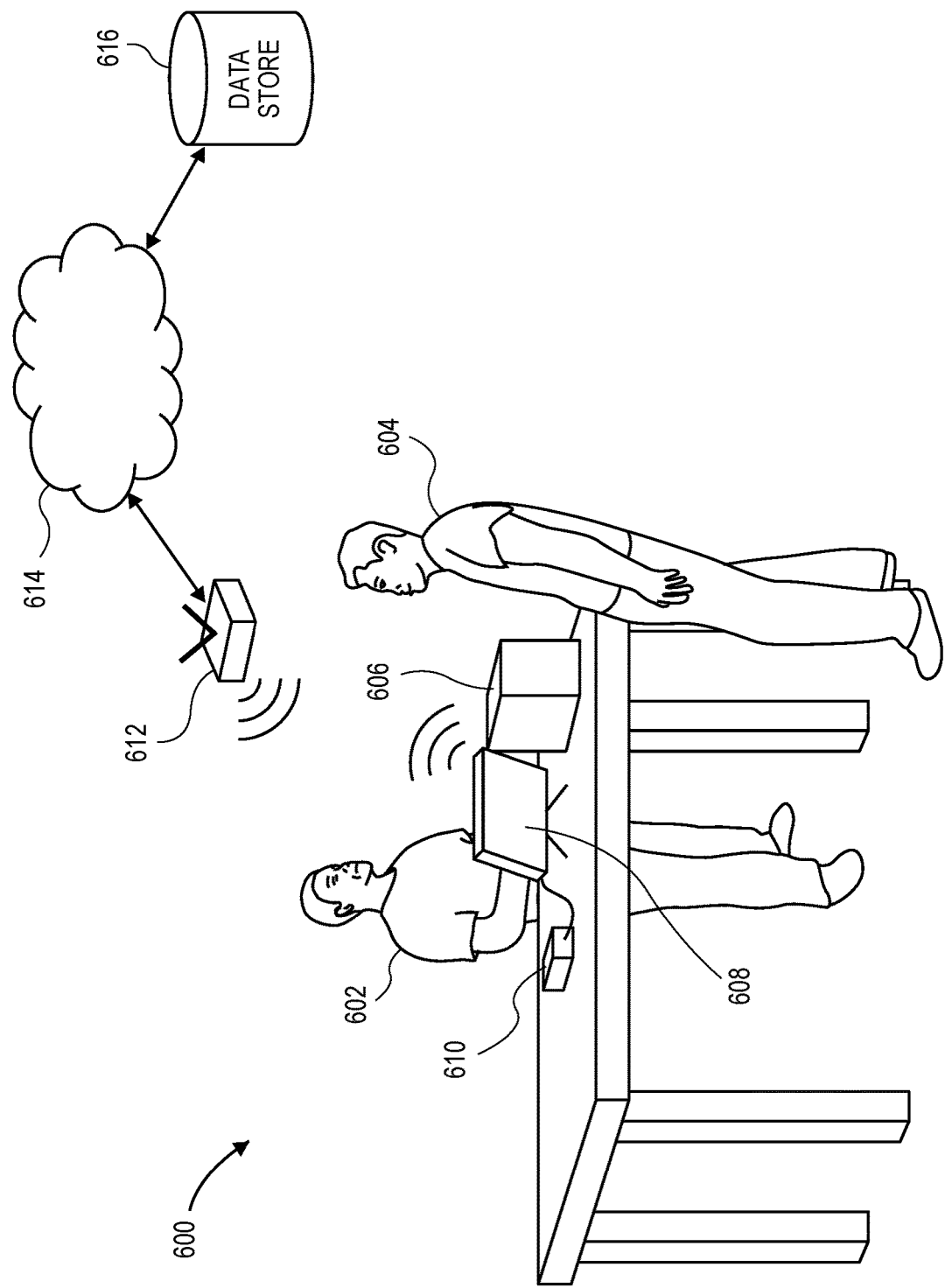
FIG. 6 depicts an exemplary scenario implementing some embodiments of the invention.

In some embodiments of the invention as depicted in FIG. 6, high-level changes to system may be made such as for change requests of workflow processes, security systems changes, application modifications or updates, updating compliance regulations, updating firewall settings, or any other software or hardware modifications that may be made to a system. These modifications may be made upon receipt of biometric identity information from an approved user. For example, as depicted in FIG. 6 a retail company employee 602 processes a purchase from a customer 604 of a purchased item 606 on a Point of Sale (POS) system 608. The POS system 608 may be connected to a biometric sensor 610 and may transmit via server 612 to the application and integration platform 614 that may run a web-based application supported by the system which, in this case, may be the application and integration platform 514. The system stores the retail transactions throughout the day including all customer purchases, account information, including a financial card and associated bank account information in a database, which may be the database management system 424. POS system 608 updates may be approved based on the settings that may be applied by the employee 602. The POS system 608 may have a system update that occurs manually or automatically based on the manufacturer, the employee 602 settings, or the firewall management system implemented on the system. An update request may be sent from a remote central POS operating system or the POS system 608 manufacturer to the POS system 608 via the system. A notification may be sent to a mobile device of the employee 602 or to the POS system 608 and is notified to provide biometric information via the biometric sensor 610. The employee 602 may receive the update information and any verification information requested by the system form the source of the update request such as the central server for the POS system 608. The employee 602 may review the information and decide that the information is valid and provide a fingerprint scan or a photo for facial recognition. The employee 602 may also question the update and request more information regarding the source of the update request or deny the update.

Alternatively, the system may automatically perform updates to the POS system 608 without the biometric input from the employee 602. The system may detect a discrepancy such as the data format, amount of data, or if location of the source does not match the previous updates. Based on the discrepancy, the system may stop the update and request authentication from the employee 602. The system may access an online database and determine that there have been new regulations requirements and the system needs to update the workflow. This may be performed automatically as well. Alternatively, the POS system 608 may be any other system that collects and/or stores sensitive data and connects online communicates with online entities that may need a level of security.

In an exemplary scenario 600 as depicted in FIG. 6 a process of requesting biometric information may be monitored on one endpoint and requested and/or analyzed using data from another endpoint. For example, the POS system 608 depicted in FIG. 6 may be connected via the system to a federal database. The purchased item 606 may be a product that requires additional information to purchase such as a firearm. The employee 602 may scan the barcode of the firearm thus creating a triggering event, or critical event, via the system, which automatically requests that information be input from the customer 604. The customer 604 may input an identification number such as a social security number or a driver's license number via a keypad or scanner such as a barcode scanner or image scanner. It also may be required that the customer 604 input biometric data such as a fingerprint scan, a retinal scan, or a facial scan via the biometric sensor 610. The information obtained from the customer 604 may securely be compared to information in data store 616 that may be a federal database that stores information related to felony charges, no-fly lists, terrorist watch lists, or any other information that may prevent the customer 604 from purchasing a firearm. From the comparison of the information from the customer 604 and the stored information, the system determines if customer 604 is allowed to purchase the firearm. The system may update any databases with the information in the transaction including the FBI database that the customer 604 purchased and owns the firearm in the event that the customer 604 was approved, or that the customer 604 attempted to purchase the firearm in the event that the customer 604 was denied.

Continuing with the exemplary embodiment depicted in FIG. 6, the employee 602 may have the authority to access sensitive data on the cloud based system or data center via the POS system 608. The employee 602 may provide multifactor authentication such as passwords, numbers, and biometric authentication such as a fingerprint, retinal, iris, palm, and facial scans or any combination thereof. In some embodiments, the employee 602 must provide a numerical code, such as a 5, 7, 10 digit, or any length code, along with a username and password to log in to the system. The numerical code may expire after a defined amount of time such as 5, 10, 60, minutes or any amount of time that may be defined automatically by the system or manually by an administrator. The employee 602 may have to provide the numerical code along with multifactor identification when accessing the system or at any point after an amount of time has passed and authentication is requested. In some embodiments, the POS system 608 is not a point of sale system and is a user interface on a computer, tablet, or mobile device and the employee 602 may access secure data at any company or business where the employee 602 has stored biometric data for approved access.

Figure 7:
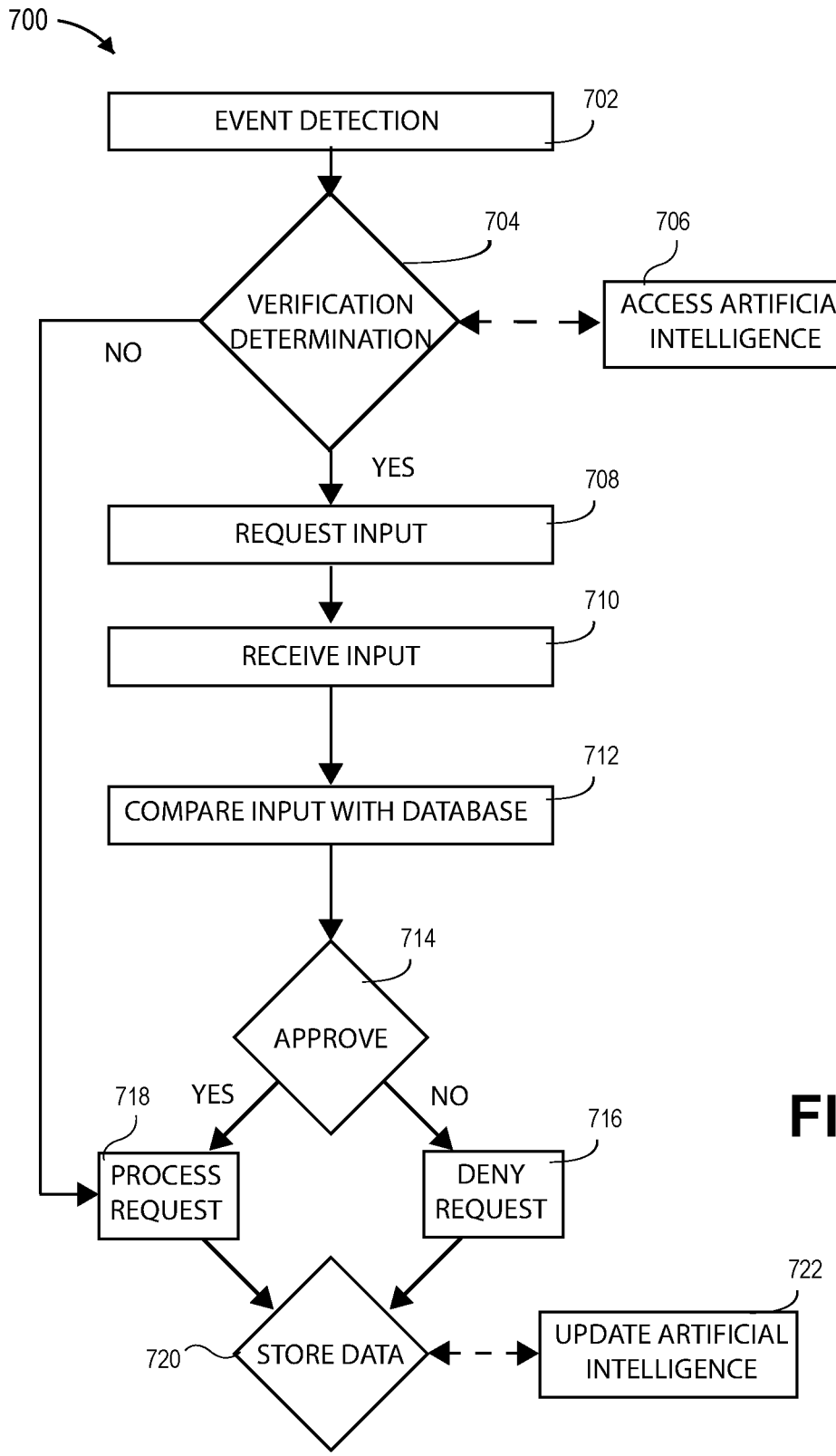
FIG. 7 depicts a flowchart illustrating the operation of a method in accordance with embodiments of the invention.

FIG. 7 depicts an exemplary flow chart 700 representing certain embodiments of the invention. A triggering event may be detected at step 702. The triggering, or critical, event may be a request by a user such as through service ticketing center for a change order, a transfer of sensitive data, detection of a threat by a firewall such as malware, or a divergence from normal operating behavior known to a data tracking system run by artificial intelligence as described above. The triggering event may take place via the system GUI or on any of the supported applications. The triggering event may be a high or low-level threat and may be software or hardware related. The threat may be a software attack such as malware or may be the detection of a user's actions such as scanning a barcode associated with a firearm. Detection of the triggering event may lead to step 704.

In step 704 the system determines the level of threat of the triggering event and determines if a response is required. The system may rank the threats or risk in levels of high, medium, low, or may assign a value such as 0-100. The level may also be a pass/fail such as a minimum or maximum threshold for a response to occur, or any combination thereof. The level of risk may determine the action that is required.

In step 706, artificial intelligence may be used to determine if verification is required. The Artificial Intelligence (AI) may be neural networks, fuzzy logic, evolutionary algorithms, statistical algorithms that incorporate learning, or any other type of algorithm using machine learning or any other mathematical optimization algorithm or theory. The AI may learn a risk level of threats or may learn when it may be considered appropriate or necessary to request certain forms of feedback such as password or biometric feedback. The artificial intelligence may also update the system for regulatory compliance as discussed above.

In step 708 the system may request input from a user based on the determination made in step 704. The input requested from the user may be based at least in part on the risk level of the threat. The input requested may also be based on the user or the person receiving the request in the event that the user and the person receiving the request are different. The request for input may be sent via text message, email, social media account, or a notification may be sent directly in the system application GUI or any way that may relay the message to the person submitting the required input.

In step 710 the system may receive the data from the input of the user. The input may be information indicative of the user such as name, address, social security number, employee identification number, or may be biometric information such as a facial feature data, fingerprint data, retinal data, DNA data or any other biological data indicative of the identity of the user. The input may be from the user that requested a change, a customer of a retail store, or a high-level administrator that has the security level needed to approve the data transfer. The input may be provided by any person to which the necessary approval is needed to continue the data transfer approval process. The person providing the input may submit the input via a mobile device, computer, or any sensing device capable of sensing the required input as described above. Input may be requested and received via the application GUI or any other application supported by the system that may be a web-based system supporting the workflow integration and application platform, firewall management, and data store and management systems.

In step 712 the data received from the user input may be compared to stored data from a previous input of the same type from the user. The system may have a stored database of data related to the user. The stored data may be used to compare to the data received via the input from the user to determine authenticity. The stored data may be stored on a profile of the user.

In step 714 a determination is made whether to approve or deny the request. The determination may be based at least in part on the comparison of the received data to the stored data in step 712. The request may be approved or denied by the system or by the person providing the input in the event that the person providing the input is different than the person submitting the change request.

In the event that a determination is made that the user has not supplied sufficient information then the request may be denied as in step 716. The request may also be denied by the user in the event that the user is not the same person that issued the change order and a higher-level administrator's approval is requested.

In the event that a determination is made that the user has supplied sufficient information to approve the request then the process moves to step 718. The request may be processed by the system by making the necessary changes to software and updating the necessary software or transferring data per the request. The change may be hardware related and the system may not be updated until after the change or not at all.

In step 720 the information related to the process may be stored. Information indicative of the input, the person providing the input, the user providing the request, the request, and any other information such as time, date, location, hardware information associate with the request and the input, or any other data associated with the process may be stored for future user.

In step 722 the artificial intelligence may also be updated with all the information provided in step 720. The artificial intelligence may use any of the information to learn and provide better service while also managing and updating the firewall to provide security that better detects and analyzes threat risks and maintains regulatory compliance. For example, data useable to determine a threat profile for data being transferred may be stored in a security profile accessible to the artificial intelligence, or in a data store for automated comparison.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system for providing security to a workflow process on a web-based system, comprising:
    a sensor configured to collect biometric data for a user;
    a processor;
    a data store storing biometric identity data for a plurality of authorized users; and
    one or more non-transitory computer-readable media storing computer-executable instructions that, when executed by the processor, perform a method of proving security to a workflow process, the method comprising steps of:
        receiving a request to transfer data from a first location to a second location;
        detecting a threat associated with the transfer of the data,
        wherein the data does not match at least one format of a previous update;
        determining a risk level of the threat;
        requesting a biometric authentication from the user based at least in part on the risk level of the threat;
        receiving, via the sensor, biometric data indicative of an identity of the user;
        comparing the biometric data indicative of the identity of the user with the biometric identity data stored in the data store;
        determining, from the comparison of the biometric data indicative of the identity of the user with the biometric identity data stored in the data store, that the user meets a minimum requirement;
        receiving, from the user, an approval of the transfer of the data, and
        automatically performing an update to store the format such that the data will not be considered a threat in the future.

2. The system of claim 1, wherein the sensor is selected from a group consisting of a retinal scanner and a camera.

3. The system of claim 1,
    wherein the sensor is a fingerprint scanner on a mobile device of the user and the request is made via the mobile device of the user,
    wherein a fingerprint scan is one factor of a multifactor authentication.

4. The system of claim 1,
    wherein the risk level of the threat is determined in part based on a determination that sensitive data is being transferred,
    wherein the risk level of the threat is determined by a third-party system.

5. The system of claim 1, wherein the risk level of the threat is determined in part based on a determination that malicious code is being transferred.

6. The system of claim 1, wherein the method further comprises the step of storing information indicative of the data and the approval of the transfer of the data.

7. The system of claim 6, wherein the method further comprises the step of updating a threat profile with the stored information for automatically detecting future threats based at least in part on the stored information.

8. The system of claim 7, wherein the method further comprises the step of updating a firewall rule based on the updated threat profile.

9. The system of claim 1, wherein the data is received from a network service center.

10. The system of claim 1, wherein the data is received from an application supported by the web-based system.

11. A method for providing security to a workflow process in a system, comprising the steps of:
receiving a request to transfer data from a first location to a second location;
analyzing the data to determine a risk level of the data, wherein the risk level is based on a format of the data compared to a regulation format;
if the risk level of the data is above a predetermined threshold, requesting identity information from a user;
receiving the identity information from the user via a biometric sensor;
comparing the identity information from the biometric sensor with stored biometric data;
determining whether the identity information from the biometric sensor and the stored biometric data match;
if the identity information from the biometric sensor matches the stored biometric data, approving the request to transfer the data; and
if the identity information from the biometric sensor does not match the stored biometric data, denying the request to transfer the data.

12. The method of claim 11, further comprising the step of activating the biometric sensor via a web-based application.

13. The method of claim 11,
wherein the biometric sensor is a camera, and
wherein the camera is one factor of a multifactor identification.

14. The method of claim 11, wherein the threshold is configurable by an administrator of the system.

15. The method of claim 11, wherein the identity information includes at least one of fingerprint information, facial recognition information, retinal information, and DNA information.

16. One or more non-transitory computer storage media storing computer-executable instructions that, when executed by a processor, perform a method of providing security to a workflow process on a web-based system, the method comprising the steps of:
receiving a request to transfer data from a first user via a first device running an application on the web-based system;
determining a security level of the data;
if the security level of the data is above a threshold, requesting authentication from an authorized user on an enrolled and verified device;
receiving biometric information indicative of an identity of the authorized user from a biometric sensor;
comparing the biometric information with stored biometric information indicative of the identity of an authorized user;
determining whether the biometric data matches the stored biometric information; and
if the biometric data matches the stored biometric data, approving the request to transfer the data from the first user.

17. The media of claim 16, wherein the biometric data is received by an application supported by the web-based system.

18. The media of claim 16, wherein the method further comprises the step of:
denying the request to transfer data if the authorized user does not meet a necessary requirement to access the data,
wherein the level of security of the data and the necessary requirement to access the data are set by an administrator of the web-based system.

19. The media of claim 16, wherein the level of security of the data is indicative of a risk of regulatory non-compliance.

20. The media of claim 16, wherein the method further comprises the steps of:
storing information indicative of the data and the approval of the transfer of the data;
updating a security profile with the stored information such that the threshold is increased;
receiving a second request to transfer second data from the application running on the web-based system;
determining that a second security level of the data is below the increased threshold; and
approving the request to transfer the data without requesting authentication.

* * * * *